United States Patent
Priede et al.

(10) Patent No.: US 8,749,581 B2
(45) Date of Patent: *Jun. 10, 2014

(54) DLP EDGE BLEND ARTEFACT REDUCTION

(71) Applicant: Christie Digital Systems USA, Inc., Cypress, CA (US)

(72) Inventors: Jordan Evalds Huxley Priede, Waterloo (CA); Jason Patrick Parachoniak, Waterloo (CA)

(73) Assignee: Christie Digital Systems, Inc., Cypress, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/896,625

(22) Filed: May 17, 2013

(65) Prior Publication Data

US 2014/0022280 A1   Jan. 23, 2014

Related U.S. Application Data

(63) Continuation of application No. 13/617,534, filed on Sep. 14, 2012, now Pat. No. 8,446,431, which is a continuation of application No. 12/436,477, filed on May 6, 2009, now Pat. No. 8,289,346.

(51) Int. Cl.
    G09G 5/00      (2006.01)
    G09G 5/02      (2006.01)

(52) U.S. Cl.
    USPC .......................................... 345/629; 345/589

(58) Field of Classification Search
    USPC .................................. 345/589, 629
    See application file for complete search history.

(56) References Cited

U.S. PATENT DOCUMENTS 5,980,044 A    11/1999   Cannon et al.
(Continued)

FOREIGN PATENT DOCUMENTS

JP        3-243931        10/1991
KR   10-2007-0024049       3/2007
WO       01/41455 A1       6/2001

OTHER PUBLICATIONS

European Search Report issued Jul. 22, 2010 in corresponding European Patent Application 10161178.8.

(Continued)

*Primary Examiner* — Ryan R Yang
(74) *Attorney, Agent, or Firm* — Staas & Halsey LLP

(57) ABSTRACT

A method of reducing visual artefacts in a blend zone of at least two projector images is provided. The method comprises determining a maximum intensity variance for each pixel group within a blend curve of the blend zone, the maximum intensity variance being based on a blend multiplier selected to achieve a net light intensity specific to the location of the pixel group within the blend curve. For each pixel group, a first adjusted blend multiplier is determined, wherein the blend multiplier is increased by at least a portion of the maximum intensity variance. For each pixel group, a second adjusted blend multiplier is also determined, wherein the blend multiplier is decreased by at least a portion of the maximum intensity variance. The light intensity of each pixel in each pixel group is adjusted using the first and second adjusted blend multipliers specific to each pixel group. The average pixel intensity of each pixel group after application of the first and second adjusted blend multipliers remains equal to the net light intensity of the pixel group within the blend curve.

5 Claims, 5 Drawing Sheets

(56) References Cited

U.S. PATENT DOCUMENTS

| | | |
|---|---|---|
| 6,753,923 B2 | 6/2004 | Gyoten |
| 6,924,816 B2 | 8/2005 | Deering |
| 7,292,207 B1 | 11/2007 | Naegle et al. |
| 7,339,625 B2 | 3/2008 | Matthys et al. |
| 7,450,137 B2 | 11/2008 | Deng et al. |
| 7,454,087 B1 | 11/2008 | Wilensky et al. |
| 8,289,346 B2 | 10/2012 | Priede et al. |
| 2002/0057361 A1 | 5/2002 | Mayer, III et al. |
| 2005/0287449 A1 | 12/2005 | Matthys et al. |
| 2007/0188719 A1 | 8/2007 | Jaynes et al. |
| 2008/0024683 A1 | 1/2008 | Damera-Venkata et al. |

OTHER PUBLICATIONS

Office Action mailed Mar. 14, 2012 in corresponding U.S. Appl. No. 12/436,477.
Notice of Allowance mailed Jul. 12, 2012 in corresponding U.S. Appl. No. 12/436,477.
Notice of Allowance mailed Mar. 5, 2013 in corresponding U.S. Appl. No. 13/617,534.
U.S. Appl. No. 12/617,534, filed Sep. 14, 2012, Jordan Evalds Huxley Priede, et al., Christie Digital Systems USA, Inc.
English Translation of Japanese Office Action mailed Jan. 14, 2014 in corresponding Japanese Application No. 2010-101790.

|  | 22 | 24 | 26 |  |
|---|---|---|---|---|
| -0.1 | +0.1 | -0.8 | +0.8 | -0.6 | +0.6 | -0.7 | +0.7 | Row 0 |
| +0.1 | -0.1 | +0.8 | -0.8 | +0.6 | -0.6 | +0.7 | -0.7 | Row 1 |
| -1.0 | +1.0 | -0.6 | +0.6 | -0.3 | +0.3 | -0.8 | +0.8 | Row 2 |
| +1.0 | -1.0 | +0.6 | -0.6 | +0.3 | -0.3 | +0.8 | -0.8 | Row 3 |

| +0.3 | -0.3 | -0.8 | +0.8 | -0.6 | +0.6 | +0.7 | -0.7 | Row 0 |
|---|---|---|---|---|---|---|---|---|
| +0.1 | -0.1 | +0.3 | -0.3 | +0.2 | -0.2 | +0.1 | -0.1 | Row 1 |
| -1.0 | +1.0 | +0.6 | -0.6 | -0.9 | +0.9 | +0.2 | -0.2 | Row 2 |
| +0.1 | -0.1 | -0.7 | +0.7 | +0.3 | -0.3 | +0.8 | -0.8 | Row 3 |

| +1.0 | -1.0 | +1.0 | -1.0 | +1.0 | -1.0 | +1.0 | -1.0 | Row 0 |
|---|---|---|---|---|---|---|---|---|
| -1.0 | +1.0 | -1.0 | +1.0 | -1.0 | +1.0 | -1.0 | +1.0 | Row 1 |
| +1.0 | -1.0 | +1.0 | -1.0 | +1.0 | -1.0 | +1.0 | -1.0 | Row 2 |
| -1.0 | +1.0 | -1.0 | +1.0 | -1.0 | +1.0 | -1.0 | +1.0 | Row 3 |

DLP EDGE BLEND ARTEFACT REDUCTION

CROSS REFERENCE

This application is a continuation U.S. patent application Ser. No. 13/617,534, filed Sep. 14, 2012, which is a continuation of U.S. patent application Ser. No. 12/436,477, filed May 6, 2009, the contents of which are incorporated herein by reference.

FIELD

The present invention pertains to the field of DLP projectors, and in particular, to a method of visual artefact reduction in the blend zone of two or more overlapping DLP projectors.

BACKGROUND

DLP projectors use one or more digital micromirror devices (DMD) to reflect light and produce a picture. Each DMD may contain more than 2 million pixel mirrors, and using pulse-width modulation (PWM), each pixel mirror is capable of producing various levels of light intensity, or shades between white and black. In PWM, each pixel mirror is rapidly repositioned (generally termed 'on' for white, and 'off' for black) in response to data bits. As such, each pixel within a picture appears to have an intermediate intensity proportional to the fraction of time the corresponding pixel mirror is on.

While each individual pixel mirror is subjected to a unique pulse sequence to achieve a desired pixel shade, similar pixel shades can have similar pulse sequences. Where a grouping of pixel mirrors in a given area of the DMD are called to exhibit similar shades, the end effect within that region can be a "block" of pixels in either an on state or an off state. This effect, herein referred to as "patterning" results in large-scale patterns at any instantaneous moment.

For single projector applications, patterning does not pose much of an issue to the viewer. Problems arise, however, in multiple-projector applications such as multiple-projector displays where electronic edge blending in the blend zone is used. It has been noted that in the blend zone, the overlapping of the aforementioned patterning results in visual artefacts most noticeable for solid colors (such as a blue sky) during eye saccades. While these visual artefacts may take on a variety of forms, they can generally be described as irregular banding patterns of increased and decreased light intensity relative to the regions adjacent the blend zone.

SUMMARY

According to a first aspect, in a blend zone that uses a blend curve for overlapping at least two projector images, provided is a method of reducing visual artefacts, comprising:

determining a maximum intensity variance for each pixel group within said blend curve, said maximum intensity variance being based on a blend multiplier selected to achieve a net light intensity specific to the location of said pixel group within said blend curve;

for each pixel group, determining a first adjusted blend multiplier wherein said blend multiplier is increased by at least a portion of said maximum intensity variance;

for each pixel group, determining a second adjusted blend multiplier wherein said blend multiplier is decreased by at least a portion of said maximum intensity variance; and adjusting the light intensity of each pixel in each said pixel group using said first and second adjusted blend multipliers specific to each said pixel group;

wherein the average pixel intensity of each said pixel group after application of said first and second adjusted blend multipliers remains equal to said net light intensity of said pixel group within said blend curve.

Additional aspects and advantages will be apparent to a person of ordinary skill in the art, residing in the details of construction and operation as more fully hereinafter described and claimed, reference being had to the accompanying drawings.

FIGURES

Embodiments of the present application will now be described, by way of example only, with reference to the attached Figures, wherein FIG. 1 is an exemplary image display based on a 3×3 arrangement of projectors;

FIG. 4 is a schematic representation of a first embodiment of spatial intensity variance for incorporation into the blend zone;

FIG. 5 is a schematic representation of a second embodiment of spatial intensity variance for incorporation into the blend zone;

FIG. 6 is a schematic representation of a third embodiment of spatial intensity variance for incorporation into the blend zone;

DESCRIPTION

Figure 1:
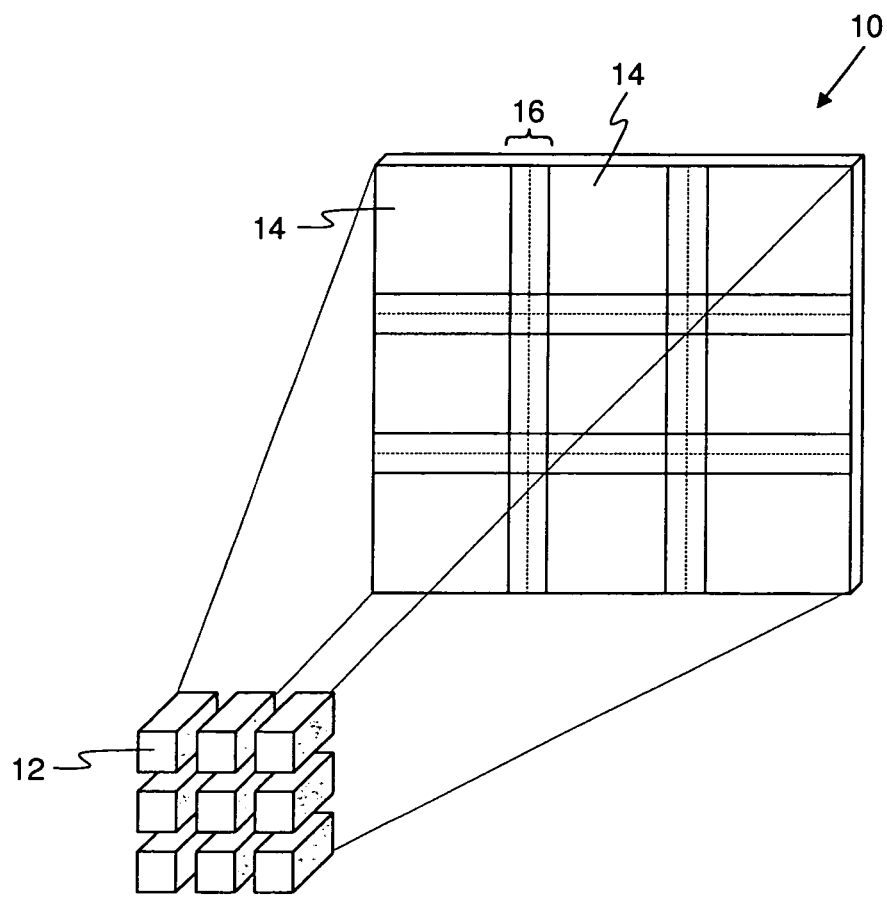

Shown in FIG. 1 is an exemplary display 10 comprising nine projector systems 12 aligned in a 3×3 configuration. To provide a contiguous image, adjacent projector images 14 are partially overlapped, creating what is termed a blend zone 16.

In the region of the blend zone 16, each projector image 14 is modified to create a blend curve. The blend curve represents a transition region from normal light intensity (e.g. 100%) generally closest to the non-overlapped image, to a reduced or faded light intensity (e.g. 0%) generally furthest away from the non-overlapped image. To achieve the blend curve, a blend multiplier (values of 0.0 to 1.0) is applied to the target light intensity based on the video signal of the pixels within the overlap region, thereby modifying the light intensity in accordance with the desired intensity for any one location within the blend curve. In general, the blend multiplier is applied as follows:

$$\text{Intensity}_{NET} = \text{Intensity}_{SIGNAL} \times B$$

where $\text{Intensity}_{NET}$ represents the net light intensity, $\text{Intensity}_{SIGNAL}$ represents the target light intensity based on the video signal (generally termed 'target light intensity') and B represents the blend multiplier. As such, $\text{Intensity}_{NET}$ is the resulting modified light intensity within the blend zone.

Figure 2:
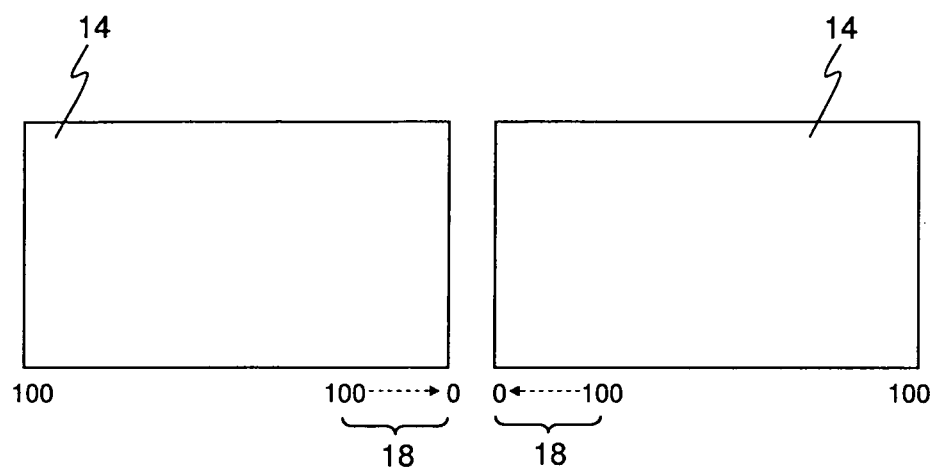
FIG. 2 is an exemplary image display based on a 1×2 arrangement of projectors.

FIG. 2 depicts an exemplary linear blend curve 18 for two projector images 14 configured to be overlapped. To the image on the right, a blend multiplier is applied to the target light intensity of the pixels to achieve a linear transition from 0% to 100% within the blend zone, starting at the left-most portion of the image. Similarly, to the image on the left, a blend multiplier is applied to the target light intensity of the pixels to achieve a linear transition from 0% to 100% within the blend zone, staring at the right-most portion of the image. The application of the blend multiplier to each projector image is such that in a composite overlapped image, the total sum light intensity for a pixel location within the blend zone substantially equals 100% of the original video signal intensity.

As mentioned above, due to the overlapping of the aforementioned patterning arising from pixel blocking in each projector system, visual artefacts appear. These visual artefacts are most noticeable with solid colors during eye saccades, which are quick, simultaneous movements of both eyes in the same direction. These movements play a key role in resolving objects, as well as serving to refresh images cast onto the rod cells and cone cells at the back of the eye.

To reduce the noted visual artefacts, a spatial intensity variance is introduced in the form of dithering, into the pixels of each projector image. In general, for each projector image, the pixel intensity of locally paired or grouped pixels are spread or varied inversely, such that the sum paired or group variance is close or equal to zero. As such, a paired or grouping of pixels will exhibit an average intensity equal to the desired intensity for that particular location in the original image. As will be appreciated, so as to not adversely affect the projected image, the applied dithering maintains the average blend curve as close as possible to the non-dithered blend.

Figure 3:
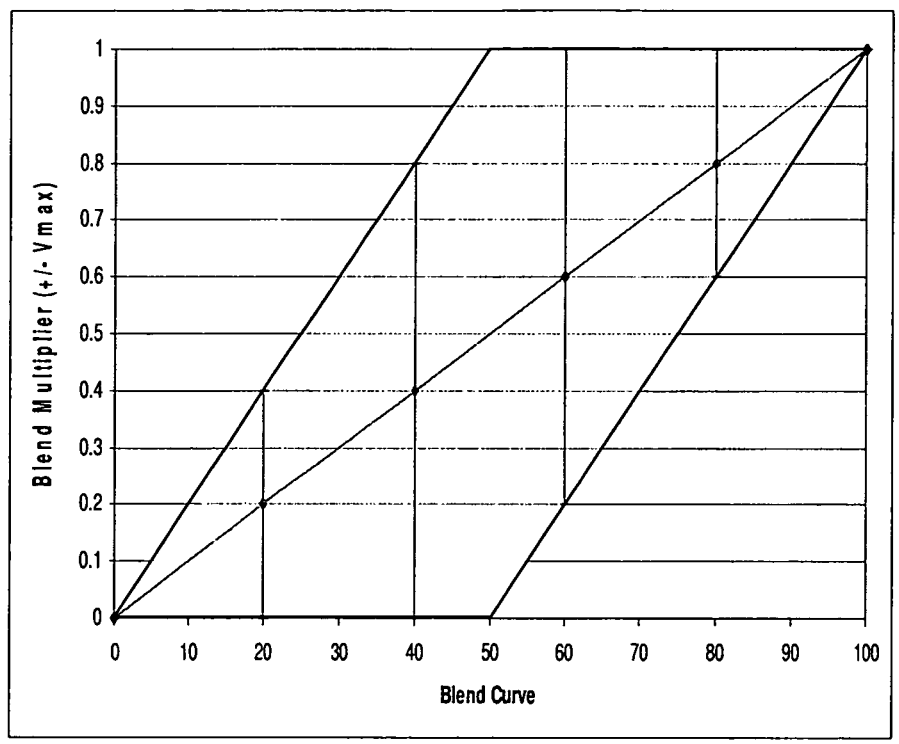
FIG. 3 is a graphical representation of maximum allowable variance based on a linear blend curve.

For a pixel pair located at a given location within the blend zone, the maximum allowable variance for the pixel pair is a function of the blend multiplier at that given location within the blend curve, as shown in FIG. 3. Based on the maximum allowable variance, the spatial intensity variance for an exemplary pixel pair is calculated as follows:

$1^{st}$ pixel in pair:

$$Pixel_{ADJ1} = Intensity_{SIGNAL} \times B_{adj(+)}$$
$$= Intensity_{SIGNAL} \times (B + V_{max})$$

$2^{nd}$ pixel in pair:

$$Pixel_{ADJ2} = Intensity_{SIGNAL} \times B_{adj(-)}$$
$$= Intensity_{SIGNAL} \times (B - V_{max})$$

where $Pixel_{ADJ1}$ represents the adjusted pixel intensity of the $1^{st}$ pixel in the pixel pair, $Pixel_{ADJ2}$ represents the adjusted pixel intensity of the $2^{nd}$ pixel in the pixel pair, $Intensity_{SIGNAL}$ represents the target light intensity, $B_{adj(+)}$ represents a first adjusted blend multiplier, $B_{adj(-)}$ represents a second adjusted blend multiplier, B represents the unadjusted blend multiplier, and $V_{max}$ represents the maximum allowed variance based on the blend multiplier. Table 1 illustrates the maximum allowable variance, as well as the corresponding adjusted pixel intensity for a range of exemplary target light intensities based on video signal intensities.

TABLE 1

Maximum spatial intensity variance for exemplary range of target light intensities based on video signal intensities

| Intensity$_{SIGNAL}$ | B | $V_{max}$ | Intensity$_{NET}$ | Pixel Pair Pixel$_{ADJ1}$ | Pixel$_{ADJ2}$ | Average Intensity |
|---|---|---|---|---|---|---|
| 100 | 1 | 0 | 100 | 100 | 100 | 100 |
|  | 0.8 | 0.2 | 80 | 100 | 60 | 80 |
|  | 0.6 | 0.4 | 60 | 100 | 20 | 60 |
|  | 0.4 | 0.4 | 40 | 80 | 0 | 40 |
|  | 0.2 | 0.2 | 20 | 40 | 0 | 20 |
|  | 0 | 0 | 0 | 0 | 0 | 0 |
| 80 | 1 | 0 | 80 | 80 | 80 | 80 |
|  | 0.8 | 0.2 | 64 | 80 | 48 | 64 |
|  | 0.6 | 0.4 | 48 | 80 | 16 | 48 |
|  | 0.4 | 0.4 | 32 | 64 | 0 | 32 |
|  | 0.2 | 0.2 | 16 | 32 | 0 | 16 |
|  | 0 | 0 | 0 | 0 | 0 | 0 |
| 50 | 1 | 0 | 50 | 50 | 50 | 50 |
|  | 0.8 | 0.2 | 40 | 50 | 30 | 40 |
|  | 0.6 | 0.4 | 30 | 50 | 10 | 30 |
|  | 0.5 | 0.5 | 25 | 50 | 0 | 25 |
|  | 0.4 | 0.4 | 20 | 40 | 0 | 20 |
|  | 0.2 | 0.2 | 10 | 20 | 0 | 10 |
|  | 0 | 0 | 0 | 0 | 0 | 0 |
| 40 | 1 | 0 | 40 | 40 | 40 | 40 |
|  | 0.8 | 0.2 | 32 | 40 | 24 | 32 |
|  | 0.6 | 0.4 | 24 | 40 | 8 | 24 |
|  | 0.4 | 0.4 | 16 | 32 | 0 | 16 |
|  | 0.2 | 0.2 | 8 | 16 | 0 | 8 |
|  | 0 | 0 | 0 | 0 | 0 | 0 |

As shown above, at a pixel pair location intended to exhibit a target light intensity ($Intensity_{SIGNAL}$) of 50%, a blend multiplier of 0.5 produces a net light intensity of 25% for each projector system. As such, the pixel mirrors for this pixel pair location will generally exhibit a 75% off/25% on pulse sequence. For a blend multiplier of 0.5, the maximum +/− variance ($V_{max}$) will be 0.5. As such, for this given pixel pair, the $1^{st}$ pixel ($Pixel_{ADJ1}$) will be adjusted to exhibit a 50% intensity ($Pixel_{ADJ1}=Intensity_{SIGNAL}\times(B+V_{max})=50\times(0.5+0.5)=50$), while the corresponding $2^{nd}$ pixel ($Pixel_{ADJ2}$) in the pair will be adjusted to exhibit a 0% intensity ($Pixel_{ADJ2}=Intensity_{SIGNAL}\times(B-V_{max})=50\times(0.5-0.5)=0$). Note that the average light intensity of the pixel pair remains 25%, thereby not adversely affecting the intended net light intensity of 25%, or the overall composite video signal intensity of 50% within the final projected image.

Variances that are less than the allowable maximum are represented as fractions thereof (e.g. $V_{+0.5}$ variance equals a 50% maximum positive variance; $V_{-0.3}$ variance equals 30% maximum negative variance). Accommodating for instances where the variance may be less than the allowable maximum, the spatial intensity variance for an exemplary pixel pair is calculated as follows:

$1^{st}$ pixel in pair:

$$Pixel_{ADJ1} = Intensity_{SIGNAL} \times B_{adj(+)}$$
$$Intensity_{SIGNAL} \times (B + (V_{max} \times V_x))$$

$2^{nd}$ pixel in pair:

$$Pixel_{ADJ2} = Intensity_{SIGNAL} \times B_{adj(-)}$$
$$Intensity_{SIGNAL} \times (B - (V_{max} \times V_x))$$

where $Pixel_{ADJ1}$ represents the adjusted pixel intensity of the $1^{st}$ pixel in the pixel pair, $Pixel_{ADJ2}$ represents the adjusted pixel intensity of the $2^{nd}$ pixel in the pixel pair, Intensity$_{SIGNAL}$ represents the target light intensity, B$_{adj(+)}$ represents a first adjusted blend multiplier, B$_{adj(-)}$ represents a second adjusted blend multiplier, B represents the unadjusted blend multiplier, V$_{max}$ represents the maximum allowed variance based on the unadjusted blend multiplier, and V$_x$ represents the fraction of variance being applied based on the allowable maximum variance. For example, in the table above, where the target light intensity (Intensity$_{SIGNAL}$) is 80% and the unadjusted blend multiplier (B) is 0.6, the maximum variance (V$_{max}$) is 0.4. As such, a V$_{+0.3}$/V$_{-0.3}$ variance provides an adjusted intensity for a pixel pair as follows:

$1^{st}$ pixel in pair(exhibiting $V_{+0.3}$)

$$Pixel_{ADJ1} = Intensity_{SIGNAL} \times B_{adj(+)}$$
$$= Intensity_{SIGNAL} \times (B + (V_{max} \times V_x))$$
$$= 80 \times (0.6 + (0.4 \times 0.3))$$
$$= 57.6$$

$2^{nd}$ pixel in pair(exhibiting $V_{-0.3}$):

$$Pixel_{ADJ2} = Intensity_{SIGNAL} \times B_{adj(-)}$$
$$= Intensity_{SIGNAL} \times (B - (V_{max} \times V_x))$$
$$= 80 \times (0.6 - (0.4 \times 0.3))$$
$$= 38.4$$

Note that the average of Pixel$_{ADJ1}$ and Pixel$_{ADJ2}$ is 48, which corresponds to Intensity$_{NET}$ for the noted values of Intensity$_{SIGNAL}$ and B.

In one embodiment, a variance in pixel intensities is created within defined matrices of pixels, wherein adjacent pairs of pixels (in both horizontal and vertical orientation) average to the desired local intensity (e.g. Intensity$_{NET}$ on application of the blend multiplier). A schematic representation of an exemplary 2×2 matrix 20 is provided in FIG. 4. As shown, a first 2×2 matrix 20 provides a V$_{-0.1}$/V$_{+0.1}$ intensity variance in row 0, and a V$_{+0.1}$/V$_{-0.1}$ intensity variance in row 1, based on the value of the blend multiplier at the location of this first 2×2 matrix. Within this matrix, the sum variance for all adjacent pixels, whether in vertical or horizontal arrangement is zero. As such, the average light intensity for this 2×2 matrix 20 remains substantially the same as the desired local light intensity (e.g. Intensity$_{NET}$) of the projected image.

Continuing with FIG. 4, in the horizontally adjacent 2×2 matrix 22, provided is a V$_{-0.8}$/V$_{+0.8}$ intensity variance in row 0, and a V$_{+0.8}$/V$_{-0.8}$ intensity variance in row 1, based again on the value of the blend multiplier at the location of this 2×2 matrix. In the $3^{rd}$ and $4^{th}$ matrices 24, 26 across the top of FIG. 4, the intensity variances are V$_{-0.6}$/V$_{+0.6}$ and V$_{-0.7}$/V$_{+0.7}$, respectively. The degree of variance within the allowable maximum variance for a particular group of pixels is randomly selected for each matrix, so as to ensure overall uniformity in the projected image.

As will be appreciated, the determination and application of the fraction of variance being applied (V$_x$) based on the allowable maximum variance can be achieved a number of different ways. In one embodiment, the area of the blend zone is set, and a value for V$_x$ is randomly determined for each 2×2 matrix within the blend zone. Exemplary source code for determining V$_x$ for 2×2 matrices in a blend zone of size xres and yres is provided as follows:

```
static double[ ][ ] paired2x2RandomGeneratorDec3(int xres,int yres)
{
    /*Version created Dec 3rd 2008*/
    double [ ][ ] array = new double[xres][yres];
    double Vx;
    for(int y=0;y<yres;y+=2) {
        for(int x=0;x<xres;x+=2) {
            Vx=Math.random( );      //between 0 and 1.0
            array[x][y]         =    Vx;
            array[x+1][y+1]     =    Vx;
            array[x+1][y]       =    -Vx;
            array[x][y+1]       =    -Vx;
        }
    }
    return array;
}
```

With the determination of V$_x$ for each 2×2 matrix within the blend zone, V$_x$ is then applied as detailed above for each of Pixel$_{ADJ1}$ and Pixel$_{ADJ2}$.

In some embodiments, to reduce the likelihood of noticeable dithering patterns arising from the introduction of spatial intensity variance, the variance applied to the blend multiplier can be inverted in quick succession. For example, as detailed above, a target light intensity of 80% with a blend multiplier of 0.6 has a maximum variance (V$_{max}$) of 0.4. A V$_{max}$ of 0.4 provides an adjusted intensity for a pixel pair of 80% and 16%. With inversion, in a first frame, the pixel pair would exhibit a 80% (Pixel$_{ADJ1}$) and 16% (Pixel$_{ADJ2}$) intensity, while in the next frame, the pixel pair would exhibit a 16% (Pixel$_{ADJ1}$) and 80% (Pixel$_{ADJ2}$) intensity. By continuing this inversion in quick succession, for example on every refresh of the projector (e.g. 120 Hz), dithering patterns due to the introduction of spatial intensity variance would be less visible.

As an alternative to the inversion method described above, in some embodiments, the fraction of the variance applied (V$_x$) to the blend multiplier can be changed in quick succession. For example, as detailed above, a target light intensity of 80% with a blend multiplier of 0.6 has a maximum variance (V$_{max}$) of 0.4. In this methodology, in a first frame, V$_x$ may be 1.0, while in the next frame, V$_x$ may be 0.4. As such, in a first frame, the pixel pair would exhibit a 80% (Pixel$_{ADJ1}$) and 16% (Pixel$_{ADJ2}$) intensity, while in the next frame, the pixel pair would exhibit a 60.8% (Pixel$_{ADJ1}$) and 35.2% (Pixel$_{ADJ2}$) intensity. By continuing this methodology in quick succession, for example on every refresh of the projector (e.g. 120 Hz), dithering patterns due to the introduction of spatial intensity variance would be less visible.

In some embodiments, alternative spatial intensity variance methodologies may be implemented to reduce the incidence of visual artefacts in the blend zone. For example, as shown in FIG. 5, each image may be adjusted with a random per pixel variance in which the dithering pattern is applied to the locally paired or grouped pixels 30 based on a random per pixel variance limited within the permissible maximum variance. As such, each pixel pair 30 arranged in rows 0, 1, 2 and 3 exhibit randomly selected variances. Once again, for each pixel pair 30, the sum of the positive/negative variance is zero, and the average intensity of the pixel pair is equal to the desired local light intensity determined prior to intensity adjustment.

Alternatively, a $1^{st}$ order checkerboard variance pattern may be introduced wherein the dithering pattern is applied to the image based on a repeating $1^{st}$ order 2×2 checkerboard variance pattern, as schematically depicted in FIG. 6. As shown, in each 2×2 matrix 32, in row 0, pixels are set to a repeating V$_{+1.0}$/V$_{-1.0}$ variance, while in row 1, pixels are set to a repeating $V_{-1.0}/V_{+1.0}$ variance. This pattern is then repeated in each 2×2 matrix of the projected image. Within the 2×2 matrix, the sum of the positive/negative variance for adjacent pixels is zero, and the average intensity of the 2×2 matrix is equal to the desired local light intensity determined for that location prior to intensity adjustment.

Figure 7:
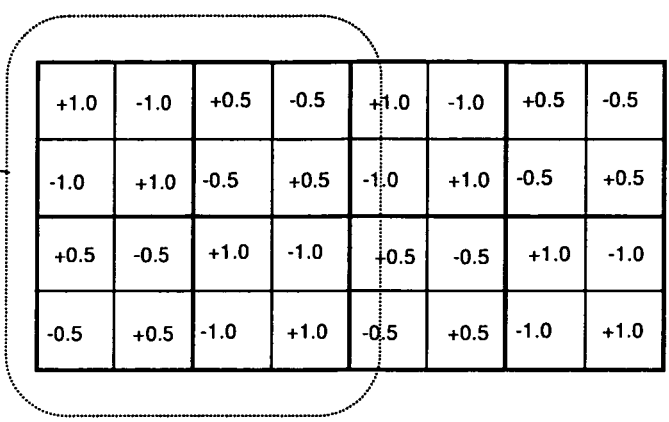
FIG. 7 is a schematic representation of a fourth embodiment of spatial intensity variance for incorporation into the blend zone.

In a further alternative, a $2^{nd}$ order checkerboard variance pattern may be implemented, wherein the dithering pattern is applied to the image based on a $2^{nd}$ order 4×4 checkerboard variance pattern, as schematically depicted in FIG. 7. As shown, in a first 4×4 matrix 34, in row 0, a first pixel pair is set to a $V_{+1.0}/V_{-1.0}$ variance, while a second pixel pair is set to a $V_{+0.5}/V_{-0.5}$ variance. In row 1, a first pixel pair is set to a $V_{-1.0}/V_{+1.0}$ variance, while a second pixel pair is set to a $V_{-0.5}/V_{+0.5}$ variance. In row 2, a first pixel pair is set to a $V_{+0.5}/V_{-0.5}$ variance, while a second pixel pair is set to a $V_{+1.0}/V_{-1.0}$ variance. In row 3, a first pixel pair is set to a $V_{-0.5}/V_{+0.5}$ variance, while a second pixel pair is set to a $V_{-1.0}/V_{+1.0}$ variance. This 4×4 matrix pattern is then repeated within the blend zone of each projector image, taking into account the maximum permissible variance based on the applied blend multiplier. As can be seen in the figure, each 4×4 matrix comprises 4 2×2 matrices. Once again, within each of these 2×2 matrices, the sum of the positive/negative variance for adjacent pixels is zero, and the average intensity of each 2×2 matrix is equal to the desired local light intensity determined for that location prior to intensity adjustment.

Figure 8:
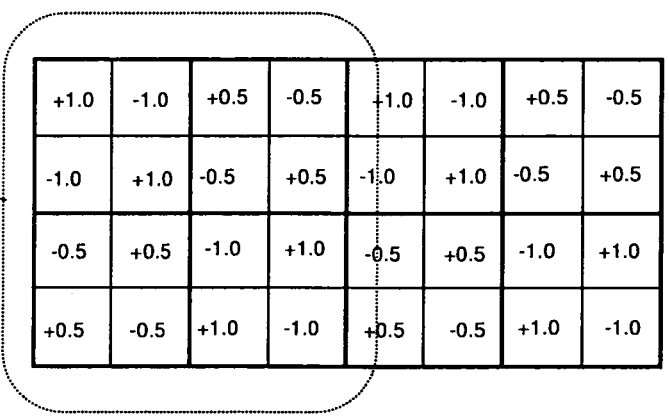
FIG. 8 is a schematic representation of a fifth embodiment of spatial intensity variance for incorporation into the blend zone.

The $2^{nd}$ order checkerboard pattern may be further modified in accordance with the variances shown in FIG. 8. In this arrangement, in a first 4×4 matrix 36, in row 0, a first pixel pair is set to a $V_{+1.0}/V_{-1.0}$ variance, while a second pixel pair is set to a $V_{+0.5}/V_{-0.5}$ variance. In row 1, a first pixel pair is set to a $V_{-1.0}/V_{+1.0}$ variance, while a second pixel pair is set to a $V_{-0.5}/V_{+0.5}$ variance. In row 2, a first pixel pair is set to a $V_{-0.5}/V_{+0.5}$ variance, while a second pixel pair is set to a $V_{-1.0}/V_{+1.0}$ variance. In row 3, a first pixel pair is set to a $V_{+0.5}/V_{-0.5}$ variance, while a second pixel pair is set to a $V_{+1.0}/V_{-1.0}$ variance. This 4×4 matrix pattern is then repeated through the image. Similar to the unmodified $2^{nd}$ order checkerboard pattern, each 4×4 matrix comprises 4 2×2 matrices. Once again, within each of these 2×2 matrices, the sum of the positive/negative variance for adjacent pixels is zero, and the average intensity of each 2×2 matrix is equal to the desired local light intensity determined for that location prior to intensity adjustment.

While capable of providing a reduction of patterning within the blend zone, the above-described alternative spatial intensity variance methodologies are particularly well suited to applications in which the variances are inverted in quick succession. Non-repeating, as well as regular repeating patterns such as the aforementioned checkerboard patterns can give rise to perceivable dither patterns on close inspection, but with rapid inversion of the variances, the likelihood of noticeable dither patterning is reduced.

The visual artefacts noticed in the blend zone of two adjacently positioned projectors are particularly noticeable with generally solid images. Where projected images are generally random, such as in the projection of leaves on a tree, the visual artefacts in the blend zone are generally less pronounced. As such, in some embodiments, the application of spatial intensity variance is restricted to instances where the blend zone comprises a substantially solid/uniform image (e.g. a solid colour background, a blue sky, etc. . . . ), or generally, to areas of the blend zone having a higher probability of producing such visual artefacts.

An exemplary use will now be described in which a display comprises two projection systems. As will be appreciated, the following is applicable for reducing artefacts in the blend zone of any number of adjacently positioned projection images wherein at least a portion of these images overlap.

In use, the projected image within the blend zone of two partially overlapping images is analyzed to determine the applicable blend multiplier to achieve the desired blend curve. Based on the blend multiplier (B) to be used in modifying the target light intensity (Intensity$_{SIGNAL}$) to achieve the blend curve, the maximum variance ($V_{max}$) is determined. Where the applied variance is a fraction of the maximum variance, a random number generator is used to generate the fraction ($V_x$) to be applied. Within a grouping of pixels, the target light intensity is then adjusted according to the blend multiplier, taking into account $V_{max}$ and the fraction thereof to be applied. As described in greater detail above, the sum of the positive intensity variance and the negative intensity variance within the pixel group should equal zero. This treatment is applied throughout the blend zone, in particular in instances where the images have a high probability of producing visual artefacts.

While the aforementioned edge blending technology has been largely described within the framework of regularly shaped blend zones arising from two or more projectors (as depicted in FIG. 1), the actual shape and complexity of the blend zones may vary. For example, in instances where two projected images are not substantially rectilinear, the blend zone therebetween may comprise an irregular/complex shape. The edge blending technology described here is intended to be applicable to blend zones of irregular/complex shape. In addition, while the transition region of the blend zone has been described herein as linear, nonlinear transition regions are also contemplated.

While the applied variance may be any value up to the maximum permitted variance, in certain applications, the applied variance may be limited. For example, in certain applications the applied variance may be limited to $V_{+0.1}/V_{-0.1}$. In other words, the applied variance may be limited to 10% of the maximal permissible variance. As will be appreciated, the limitation may be case specific, with the limitation being selected from a range of 0% to 100% of maximum permissible variance.

While the degree of variance can be randomly selected, spatial intensity variance may also be applied in a non-random manner. For example, the variance may be pseudo-random, or based on a pattern that would 'appear' random to a viewer, but is technically deterministic.

While specific dithering patterns have been described, a variety of dithering patterns in which the sum paired or group variance is close or equal to zero are potentially viable, so long as the +/− variance within each paired or group is significant enough to disrupt the patterning caused by the grouping of largely on or largely off pixels.

While described within the field of DLP projectors, the spatial intensity variance methodology described herein can be applied to other image projection technologies where PWM is used create a projected image from a plurality of projectors.

It will be appreciated that, although embodiments have been described and illustrated in detail, various modifications and changes may be made. While several embodiments are described above, some of the features described above can be modified, replaced or even omitted. Further alternatives and modifications may occur to those skilled in the art. All such alternatives and modifications are believed to be within the scope of the invention and are covered by the claims appended hereto.

The invention claimed is:

1. In a blend zone that uses a blend curve for overlapping at least two projector images, a method of reducing visual artefacts, comprising:

determining a maximum intensity variance for each pixel group within said blend curve, said maximum intensity variance being based on a blend multiplier selected to achieve a net light intensity specific to the location of said pixel group within said blend curve;

for each pixel group, determining a first adjusted blend multiplier wherein said blend multiplier is increased by at least a portion of said maximum intensity variance;

for each pixel group, determining a second adjusted blend multipler wherein said blend multiplier is decreased by said at least a portion of said maximum intensity variance; and adjusting the light intensity of each pixel in each said pixel group using said first and second adjusted blend multipliers specific to each said pixel group, such that the pixel intensity of each pixel is varied inversely while maintaining a group variance of approximately zero;

wherein the average pixel intensity of each said pixel group after application of said first and second adjusted blend multipliers remains equal to said net light intensity of said pixel group within said blend curve while reducing patterning artefacts within said block of pixels.

2. The method according to claim 1, wherein said first adjusted blend multiplier represents said blend multiplier increased by said maximum intensity variance, and wherein said second adjusted blend multiplier represents said blend multiplier decreased by said maximum intensity variance.

3. The method according to claim 1, wherein the use of said first and second adjusted blend multipliers in establishing the blend curve is restricted to regions of said blend zone having substantially uniform image characteristics.

4. The method according to claim 1, wherein said blend curve is linear.

5. The method according to claim 1, wherein said portion of maximum intensity variance is limited to a value that is less than said maximum intensity variance.

* * * * *

UNITED STATES PATENT AND TRADEMARK OFFICE
CERTIFICATE OF CORRECTION

| | |
|---|---|
| PATENT NO. | : 8,749,581 B2 |
| APPLICATION NO. | : 13/896625 |
| DATED | : June 10, 2014 |
| INVENTOR(S) | : Jordan Evalds Huxley Priede et al. |

It is certified that error appears in the above-identified patent and that said Letters Patent is hereby corrected as shown below:

In the Claims

Column 9, Line 14, In Claim 1, delete "multipler" and insert -- multiplier --, therefor.

Signed and Sealed this
Twenty-eighth Day of October, 2014

Michelle K. Lee
*Deputy Director of the United States Patent and Trademark Office*